(No Model.)
N. W. CONDICT.
PIPE JOINT.
No. 521,017. Patented June 5, 1894.
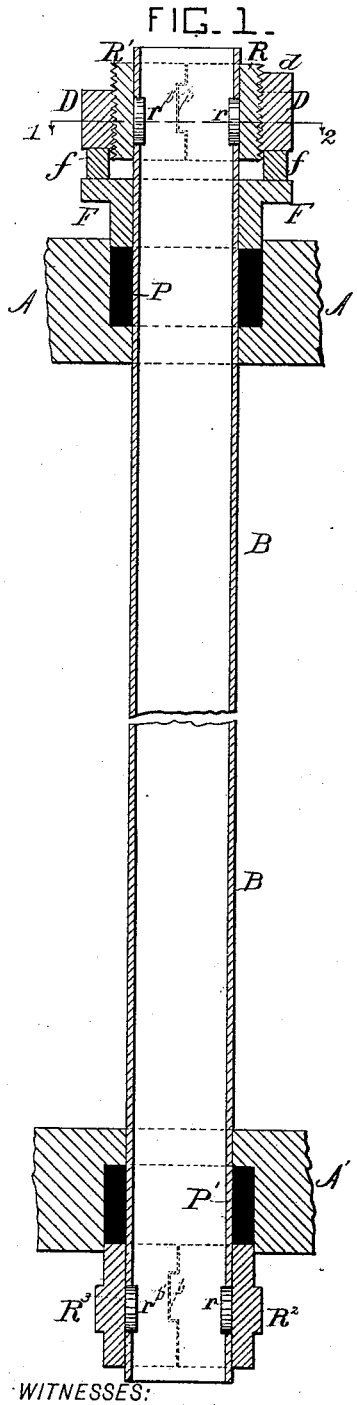
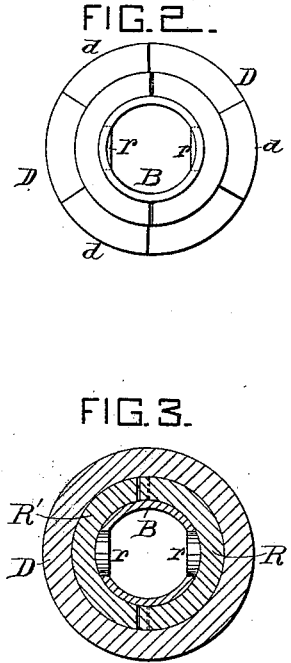
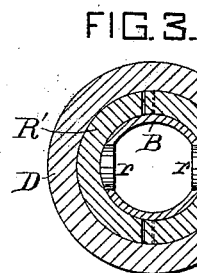
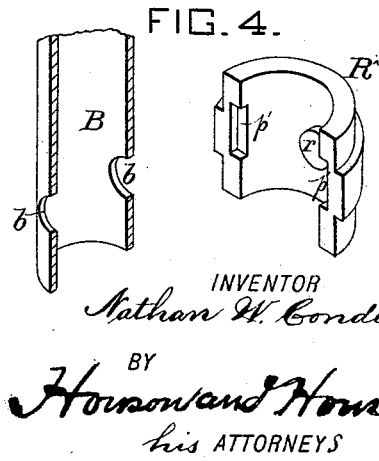
WITNESSES:
George Baumann
Edith J. Griswold
INVENTOR
Nathan W. Condict
BY
Howson and Howson
his ATTORNEYS

United States Patent Office.

NATHAN W. CONDICT, OF JERSEY CITY, NEW JERSEY.

PIPE-JOINT.

SPECIFICATION forming part of Letters Patent No. 521,017, dated June 5, 1894.

Application filed May 3, 1893. Serial No. 472,858. (No model.)

*To all whom it may concern:*

Be it known that I, NATHAN W. CONDICT, a citizen of the United States, residing at Jersey City, Hudson county, New Jersey, have invented an Improved Pipe-Joint, of which the following is a specification.

My invention relates to joints for the pipes of absorbers or condensers of refrigerating apparatus and other appliances where joints have to be made between pipes and diaphragms or cylinder heads, and the object of my invention is to provide for this purpose a construction of joint which shall be simple, easily applied and easily detached, and yet thoroughly efficient in making the connection tight between the exterior of the pipe and the cylinder heads or diaphragms.

In the accompanying drawings, Figure 1 is a longitudinal section of a pipe and parts of cylinder heads or diaphragms provided with my improved joint. Fig. 2 is a plan view of the same. Fig. 3 is a section on the line 1—2, Fig. 1; and Fig. 4 is a perspective view of parts of one of the joints at one end of the pipe.

Referring to Fig. 1, A and A' represent cylinder heads or diaphragms to which the opposite ends of the pipe B are to be secured with tight joints. In the outer faces of the cylinder heads or diaphragms there are formed around the openings through which the pipe passes annular recesses or boxes for the reception of packing P. The ends of the pipe protruding beyond the packing are provided with detachable two-part collars R R' (R² R³), which are to be connected to the pipe preferably by means of lugs $r$ on the inner faces of the two parts of the ring entering openings $b$ in the side walls of the tubes. I prefer to provide the adjoining faces of the two parts of the ring with projections $p$ on one part entering corresponding recesses in the other part $p'$, Figs. 1 and 4. These two-part collars are to be the medium through which the packing is to be compressed to make tight joints, and the exterior of this two-part collar at one end (the upper in Fig. 1) is threaded for the reception of a threaded ring D which may be provided on its outer face with suitable projections $d$ (Figs. 1 and 2) for the application of a tool to turn it. This ring D bears directly, or indirectly through the medium of a thick washer or loose ring $f$, upon a follower F which can be forced by the screw-ring D down upon the packing in the recess or box in the cylinder head or diaphragm to make a perfectly tight joint around the pipe B.

The above described devices may be used for the joints at both ends of the tube, but I prefer to provide the described construction at only one end of the tube, as illustrated in Fig. 1, and to provide at the opposite end the simpler construction, illustrated at the lower part of Fig. 1. In this construction I use the two-part collar R² R³ secured to the end of the tube as described, except that in this case the outer surface of the two-part collar does not need to be threaded and is arranged to bear directly upon the packing P' in the recess or box in the diaphragm or cylinder head A', the intermediate follower F being dispensed with. The means for compressing the packing, consisting of the threaded ring and follower are relied on to compress the packing and make tight joints at both ends through the pull on the pipe itself.

While I have shown and described the detachable collars for the pipe as made in two parts, and while I prefer that form, I wish it to be understood that I use the expression "two-part" in a sufficiently wide sense to include collars with a larger number of parts, if desired.

I claim as my invention—

1. The combination of two cylinder heads or diaphragms with a pipe connected to one of the cylinder heads and passing through the other, and having at this latter a packing and a two-part collar detachably secured to the pipe and means for applying pressure to the packing through the pipe and detachable collar, substantially as described.

2. A pipe joint comprising a cylinder head or diaphragm and packing in combination with a pipe and a two-part collar detachably secured to the pipe and threaded on its exterior, with a screw-ring applied thereto and a follower to be acted on by the ring and to press upon the packing, substantially as described.

3. The combination of two cylinder heads or diaphragms and packings with a pipe passing through the same and having at opposite ends detachable two-part collars and means for applying pressure to the packing from the said collars, substantially as described.

4. A pipe joint comprising a cylinder head or diaphragm and packing in combination with a pipe passing through the same, and provided with openings beyond the diaphragm or head and a two-part collar having lugs to engage said openings and means for applying pressure to the packing from the said collar substantially as described.

5. The combination of two cylinder heads or diaphragms and packings therefor, with a pipe passing through the same, and having at one end a two-part collar detachably secured to the pipe and at the other end a threaded two-part collar detachably secured to the pipe, a screw ring applied to the threaded collar and a follower to be acted on by the ring and bear on the packing, all substantially as described.

In testimony whereof I have signed my name to this specification in the presence of two subscribing witnesses.

NATHAN W. CONDICT.

Witnesses:
EDITH J. GRISWOLD,
HUBERT HOWSON.